US010329374B2

(12) United States Patent
Desbois et al.

(10) Patent No.: US 10,329,374 B2
(45) Date of Patent: Jun. 25, 2019

(54) METHOD FOR PRODUCING A THERMOPLASTIC COPOLYMERS FROM POLYCAPROLACTAM AND THERMOPLASTIC POLYURETHANE

(71) Applicant: BASF SE, Ludwigshafen (DE)

(72) Inventors: Philippe Desbois, Edingen-Neckarhausen (DE); Rajan Hollmann, Bad Essen (DE); Dirk Kempfert, Stemwede-Dielingen (DE); Bernd Bruchmann, Freinsheim (DE); Frank Thielbeer, Magdeburg (DE); Rolf Muelhaupt, Freiburg (DE)

(73) Assignee: BASF SE, Ludwigshafen (DE)

( * ) Notice: Subject to any disclaimer, the term of this patent is extended or adjusted under 35 U.S.C. 154(b) by 248 days.

(21) Appl. No.: 15/114,994

(22) PCT Filed: Jan. 30, 2015

(86) PCT No.: PCT/EP2015/051898
§ 371 (c)(1),
(2) Date: Jul. 28, 2016

(87) PCT Pub. No.: WO2015/114076
PCT Pub. Date: Aug. 6, 2015

(65) Prior Publication Data
US 2016/0340465 A1 Nov. 24, 2016

(30) Foreign Application Priority Data
Jan. 31, 2014 (EP) .................. 14153514

(51) Int. Cl.
C08G 18/83 (2006.01)
C08G 18/20 (2006.01)
C08G 18/48 (2006.01)
C08G 18/76 (2006.01)
C08G 18/73 (2006.01)
C08G 18/32 (2006.01)
C08G 18/75 (2006.01)
C08G 18/08 (2006.01)
C08L 77/02 (2006.01)
C08G 69/18 (2006.01)

(52) U.S. Cl.
CPC ....... *C08G 18/833* (2013.01); *C08G 18/0895* (2013.01); *C08G 18/2018* (2013.01); *C08G 18/3206* (2013.01); *C08G 18/4854* (2013.01); *C08G 18/73* (2013.01); *C08G 18/758* (2013.01); *C08G 18/7657* (2013.01); *C08G 18/7671* (2013.01); *C08G 69/18* (2013.01); *C08L 77/02* (2013.01); *C08G 2120/00* (2013.01)

(58) Field of Classification Search
None
See application file for complete search history.

(56) References Cited

U.S. PATENT DOCUMENTS

| 3,491,067 | A | * | 1/1970 | Sellet | ............ B23C 3/02 162/164.6 |
| 2003/0087982 | A1 | * | 5/2003 | Kanazawa | ............ C08J 7/047 522/49 |
| 2010/0288435 | A1 | * | 11/2010 | D'herbecourt | ....... A43B 13/386 156/272.6 |

FOREIGN PATENT DOCUMENTS

CN 1844193 A 10/2006
DE 10 2006 036 539 A1 2/2008

OTHER PUBLICATIONS

International Search Report dated May 11, 2015 in PCT/EP2015/051898 filed Jan. 30, 2015.
Lianlong Hou, et. al., "Preparation and characterization of thermoplastic polyurethane elastomer and polyamide 6 blends by in situ anionic ring-opening polymerization of ε-caprolactam", Polymer Engineering and Science, 2006, vol. 46, pp. 1196-1203, XP002738412.
Lian-Long Hou, et. al. "A novel approach to the preparation of thermoplastic polyurethane elastomer and polyamide 6 blends by in situ anionic ring-opening polymerization of ε-caprolactam", Polym. Int., 2006, vol. 55, pp. 643-649.

* cited by examiner

*Primary Examiner* — Jeffrey D Washville
(74) *Attorney, Agent, or Firm* — Oblon, McClelland, Maier & Neudstadt, L.L.P.

(57) ABSTRACT

The present invention relates to a process for preparing a thermoplastic copolymer from polycaprolactam and thermoplastic polyurethane (TPU), to thermoplastic copolymers thus obtained and to shaped articles formed from copolymers of this type.

20 Claims, No Drawings

METHOD FOR PRODUCING A THERMOPLASTIC COPOLYMERS FROM POLYCAPROLACTAM AND THERMOPLASTIC POLYURETHANE

This application is a National Phase of PCT/EP2015/051898, which was filed on Jan. 30, 2015. This application is based upon and claims the benefit of priority to European Application No. 14153514.6, which was filed Jan. 31, 2014.

The present invention relates to a process for preparing a thermoplastic copolymer from polycaprolactam and thermoplastic polyurethane (TPU), to thermoplastic copolymers thus obtained and to shaped articles formed from copolymers of this type.

Two or more polymers are copolymerizable in the melt to obtain copolymers having improved chemical and/or mechanical properties as compared with the original polymers used. A melt of two or more polymers is copolymerizable even when the polymers used as starting materials are immiscible or only partly miscible, since the copolymers formed in the course of the copolymerization act as compatibilizers between the immiscible or partly miscible polymers to reduce the interfacial tension at the phase boundary between the immiscible or partly miscible polymers and increase the adhesion between the immiscible or partly miscible polymers.

G. S. Yang et al., "Preparation and characterisation of thermoplastic polyurethane elastomer and polyamide 6 blends by in situ anionic ring-opening polymerization of ε-caprolactam", Polymer Engineering and Science 2006, 46, pp. 1196-1203 and G. S. Yang et al. "A novel approach to the preparation of thermoplastic polyurethane elastomer and polyamide 6 blends by in situ anionic ring-opening polymerisation of epsilon-caprolactam", Polym. Int. 2006, 55, pages 643-649 disclose the preparation of blends from polycaprolactam and thermoplastic polyester-based polyurethane elastomer (TPEU). These blends are obtained on admixing sodium caprolactam as a polymerization catalyst to a mixture at 160° C. of caprolactam and a TPEU based on poly(tetramethylene ether glycol) and methylenediphenyl diisocyanate (MDI). This mixture is maintained at 160° C. for 30 min, and the polymerization is conducted at 180° C. for 60 min. The process described by G. S. Yang et al. has the disadvantage that the polymerization is carried out at a relatively high temperature and for a relatively long time. A further disadvantage of this process is that the blend thus obtained requires a burdensome workup—extraction in THF; dissolving in formic acid, repeated precipitation with excess THF—to isolate a copolymer based on TPEU and polycaprolactam from the blend.

DE 10 2006 036 539 A1 discloses a process for preparing thermoplastically processable molding materials from a mixture of polyamide and thermoplastic polyurethane. The molding materials are formed by in situ polymerization of a melt comprising C4-C12 lactam, or lactam mixture, and thermoplastic polyurethane in the presence of a basic catalyst at a temperature in the range from 180 to 260° C. Copolymers of polyamide and thermoplastic polyurethane are formed in the course of this polymerization. In preferred embodiments, sodium acetanilide is admixed as a polymerization catalyst to a mixture at 100° C. of laurolactam alone or combined with caprolactam and a thermoplastic polyurethane based on polycaprolactone and methylenediphenyl diisocyanate (MDI) and the polymerization is induced by raising the temperature of the mixture to 225-240° C. The process of DE 10 2006 036 539 A1 has the disadvantage that the polymerization is carried out at a relatively high temperature.

It is an object of the present invention to provide an improved process for preparing copolymers from polycaprolactam and thermoplastic polyurethane.

We have found that, surprisingly, this object is achieved by a process for preparing a thermoplastic copolymer from polycaprolactam and thermoplastic polyurethane that utilizes a specific thermoplastic polyurethane to allow a particularly advantageous, low polymerization temperature.

The present invention accordingly provides a process for preparing a thermoplastic copolymer based on polycaprolactam and a thermoplastic polyurethane, comprising:
a) providing caprolactam;
b) providing the thermoplastic polyurethane having a melting temperature $T_0$ and based on
   (i) an alkylene diisocyanate;
   (ii) an alkylenediol; and
   (iii) a polyalkylene ether;
c) preparing a liquid mixture comprising the caprolactam and the thermoplastic polyurethane at a temperature $T_1$;
d) admixing a polymerization catalyst to the liquid mixture of c) to obtain a mixture comprising the caprolactam and the thermoplastic polyurethane in a mass ratio of caprolactam to thermoplastic polyurethane in the range from 3:1 to 1:4 and polymerizing at a temperature $T_2$ of at most 175° C. to obtain the thermoplastic copolymer.

We have found that, surprisingly, the step of providing the specific aliphatic thermoplastic polyurethane of b) makes possible the polymerizing as per d) at a particularly advantageous, low polymerization temperature $T_2$ of at most 175° C. without incurring disruptive crystallizations and/or precipitations in the polymerization mixture. The lower polymerization temperature $T_2$, as compared with the prior art, further prevents adverse secondary reactions of the type that can arise at higher polymerization temperatures. This advantageously results in less by-production, thereby increasing the yield of the process and facilitating the purification of the end product. We further found that, surprisingly, the step of providing an aliphatic thermoplastic polyurethane as per b) causes the polymerizing as per d) to proceed at a faster rate than a copolymerization of caprolactam with an aromatic thermoplastic polyurethane where at least one diisocyanate, diol and ether component comprises an aromatic moiety.

It is a further object of the present invention to provide copolymers of polycaprolactam and thermoplastic polyurethane that have improved mechanical properties.

We have found that, surprisingly, this object is achieved by a specific selection of the thermoplastic polyurethane as a constituent of the copolymer of the present invention, which is based on polycaprolactam and a thermoplastic polyurethane. Advantageous mechanical properties are engineerable into the copolymer of the present invention by virtue of this specific thermoplastic polyurethane.

The present invention accordingly also provides a thermoplastic copolymer based on polycaprolactam and a thermoplastic polyurethane based on
(i) an alkylene diisocyanate;
(ii) an alkylenediol; and
(iii) a polyalkylene ether,
wherein the copolymer comprises the thermoplastic polyurethane in an amount of 25 to 80 wt % (percent by weight), based on the sum total of the weights of the caprolactam and of the thermoplastic polyurethane which are present in the copolymer.

It is yet a further object of the present invention to provide shaped articles having improved mechanical properties from thermoplastic copolymers based on polycaprolactam and thermoplastic polyurethane.

We have found that, surprisingly, this object is achieved by a shaped article obtained from the copolymer of the present invention.

The present invention accordingly further provides a shaped article obtained or obtainable from the thermoplastic copolymer of the present invention.

Step a)

The step of providing as per a) is in principle not subject to any special limitation. The caprolactam of a) may be provided in the solid state, for example in the form of a powder or a pellet material, for example. Alternatively, the caprolactam may be provided in a molten state, in which case the caprolactam is preferably melted at not less than 80° C., more preferably in the range from 100 to 175° C., more preferably from 100 to 160° C., more preferably from 110 to 150° C. The caprolactam is preferably provided by a) in a solid state or in a molten state, more preferably in a molten state.

Step b)

The alkylene moieties of the alkylene diisocyanate at (i), of the alkylenediol at (ii) and of the polyalkylene ether at (iii) are not subject to any special limitation and may each in principle be in a substituted or unsubstituted state. Alkylene moieties in a substituted state preferably have one or more than one substituent, more preferably from one to three substituents, more preferably one substituent, for example. Substituents may be different or identical. Substituents must be inert under the conditions of step c) or d), which is why alkyl moieties are preferable for example. C1-C6 Alkyl moieties are more preferable and C1-C3 alkyl moieties yet more preferable.

The alkylene moieties of the alkylene diisocyanate at (i), of the alkylenediol at (ii) and of the polyalkylene ether at (iii) are preferably in an unsubstituted state.

The alkylene diisocyanate of (i) is preferably selected from the group consisting of C1 to C20 alkylene diisocyanates and a mixture of two or more thereof, more preferably from the group consisting of C3 to C18 alkylene diisocyanates and a mixture of two or more thereof, more preferably from the group consisting of C6 to C13 alkylene diisocyanates and a mixture of two or more thereof, more preferably from the group consisting of 1,6-hexamethylene diisocyanate (HDI), 4,4'-diisocyanatodicyclohexylmethane (H12MDI), 1-isocyanato-3-isocyanatomethyl-3,5,5-trimethylcyclohexane (IPDI) and a mixture of two or more thereof.

For example, C1 to C20 alkylene diisocyanates are selected from the group consisting of C1, C2, C3, C4, C5, C6, C7, C8, C9, C10, C11, C12, C13, C14, C15, C16, C17, C18, C19, C20 alkylene diiscocyanate and a mixture of two or more thereof, and C6 to C13 alkylene diisocyanates are selected from the group consisting of C6, C7, C8, C9, C10, C11, C12, C13 alkylene diisocanate and a mixture of two or more thereof.

The alkylenediol of (ii) is preferably selected from the group consisting of C1 to C20 alkylenediols and a mixture of two or more thereof, more preferably from the group consisting of C3 to C8 alkylenediols and a mixture of two or more thereof, more preferably from the group consisting of C4 to C6 alkylenediols and a mixture of two or more thereof, more preferably from the group consisting of 1,4-butanediol, 1,6-hexanediol and a mixture thereof.

For example, C1 to C20 alkylenediols are selected from the group consisting of C1, C2, C3, C4, C5, C6, C7, C8, C9, C10, C11, C12, C13, C14, C15, C16, C17, C18, C19, C20 alkylenediol and a mixture of two or more thereof, and C3 to C8 alkylene diols are selected from the group consisting of C3, C4, C5, C6, C7, C8 alkylenediol and a mixture of two or more thereof.

The polyalkylene ether of (iii) is preferably selected from the group consisting of poly(C1 to C20 alkylene) ethers and a mixture of two or more thereof, further preferably from the group consisting of poly(C2 to C12 alkylene) ethers and a mixture of two or more thereof, further preferably from the group consisting of poly(C2 to C6 alkylene) ethers and a mixture of two or more thereof, wherein the polyalkylene ether of (iii) is further preferably polytetrahydrofuran.

For example, poly(C1 to C20 alkylene) ethers are selected from the group consisting of poly(C1 alkylene) ether, poly(C2 alkylene) ether, poly(C3 alkylene) ether, poly(C4 alkylene) ether, poly(C5 alkylene) ether, poly(C6 alkylene) ether, poly(C7 alkylene) ether, poly(C8 alkylene) ether, poly(C9 alkylene) ether, poly(C10 alkylene) ether, poly(C11 alkylene) ether, poly(C12 alkylene) ether, poly(C13 alkylene) ether, poly(C14 alkylene) ether, poly(C15 alkylene) ether, poly(C16 alkylene) ether, poly(C17 alkylene) ether, poly(C18 alkylene) ether, poly(C19 alkylene) ether, poly(C20 alkylene) ether and a mixture of two or more thereof, and poly(C2 to C6 alkylene) ethers are selected from the group consisting of poly(C2 alkylene) ether, poly(C3 alkylene) ether, poly(C4 alkylene) ether, poly(C5 alkylene) ether, poly(C6 alkylene) ether and a mixture of two or more thereof.

The number of carbon atoms which is specified for the particular alkylene moieties of the alkylene diisocyanate at (i), of the alkylenediol at (ii) and of the polyalkylene ether at (iii) relates to the total number of carbon atoms in the alkylene moiety. "020 Alkylene" is for instance to be understood as meaning an alkylene moiety that has 20 carbon atoms.

The polyalkylene ether of (iii) preferably has a number-average molecular weight ($M_n$) in the range from 300 to 8000 g, more preferably from 600 to 4500 g, more preferably from 800 to 2500 g.

Preferably, the thermoplastic polyurethane of b) is based on an alkylene diisocyanate as per (i) selected from the group consisting of C1 to C20 alkylene diisocyanates and a mixture of two or more thereof, an alkylenediol as per (ii) selected from the group consisting of C1 to C20 alkylenediols and a mixture of two or more thereof and a polyalkylene ether as per (iii) having a number-average molecular weight ($M_n$) in the range from 300 to 8000 g selected from the group consisting of poly(C1 to C20 alkylene) ethers and a mixture of two or more thereof. More preferably, the thermoplastic polyurethane of b) is based on an alkylene diisocyanate as per (i) selected from the group consisting of C6 to C13 alkylene diisocyanates and a mixture of two or more thereof, an alkylenediol as per (ii) selected from the group consisting of C4 to C6 alkylenediols and a mixture of two or more thereof and a polyalkylene ether as per (iii) having a number-average molecular weight ($M_n$) in the range from 600 to 4500 g selected from the group consisting of poly(C2 to C6 alkylene) ethers. More preferably, the thermoplastic polyurethane of b) is based on an alkylene diisocyanate as per (i) selected from the group consisting of 1,6-hexamethylene diisocyanate (HDI), 4,4'-diisocyanato-dicyclohexylmethane (H12MDI), 1-isocyanato-3-isocyanatomethyl-3,5,5-trimethylcyclohexane (IPDI) and a mixture of two or more thereof, an alkylenediol as per (ii) selected from the group consisting of 1,4-butanediol and 1,6-hexanediol or a mixture thereof and a polyalkylene ether as per (iii) selected from polytetrahydrofuran having a number-average molecular weight ($M_n$) in the range from 800 to 2500 g. More preferably, the thermoplastic polyurethane of b) is based on (i) 1,6-hexamethylene diisocyanate (HDI) or 4,4'-diisocyanatodicyclohexylmethane (H12MDI), (ii) 1,4-butanediol or 1,6-hexanediol and (iii) polytetrahydrofuran having a number-average molecular weight ($M_n$) in the range from 800 to 2500 g.

Preferably, one or more, further preferably two or more, further preferably all of the components alkylene diisocyanate (i), alkylenediol (ii) and polyalkylene ether (iii) have a linear and/or cyclic alkylene moiety. More preferably said alkylene diisocyanate (i) has a linear and/or cyclic alkylene moiety, said alkylenediol (ii) has a linear alkylene moiety and said polyalkylene ether (iii) has a linear alkylene moiety.

As used herein, the term "linear and cyclic alkylene moiety" is to be understood as meaning an alkylene moiety that is assembled from at least one linear alkylene moiety and at least one cyclic alkylene moiety, for example the dicyclohexylmethane moiety of 4,4'-diisocyanatodicyclohexylmethane (H12MDI).

The thermoplastic polyurethane of b) preferably has a number-average molecular weight ($M_n$) in the range from 10 000 to 300 000 g, more preferably from 15 000 to 200 000 g, more preferably from 19 000 to 160 000 g.

The melting temperature $T_0$ of the thermoplastic polyurethane at b) is preferably in the range from 155 to 280° C., more preferably from 160 to 250° C., more preferably from 170 to 230° C.

Step c)

As used at c), the term "liquid mixture" is to be understood as meaning a mixture in which, at the temperature $T_1$, the thermoplastic polyurethane is dissolved in the molten caprolactam. When the temperature $T_1$ is greater than or equal to the melting temperature $T_0$, some at least of the thermoplastic polyurethane will melt and is accordingly present in the mixture in a liquid state without its having to be dissolved by the molten caprolactam.

The step of preparing the liquid mixture as per c) is not subject to any special limitation. Preferably $T_1$ is not more than $T_0$. More preferably $T_1$ is in the range from 100 to 175° C., more preferably from 100 to 160° C., more preferably from 110 to 150° C. Therefore, the mixture of c) may be provided at an advantageously low temperature $T_1$ which not only reduces the energy requirements of this process step but is also effective in preventing the formation of undesired by-products even before the polymerizing of d).

Step d)

Surprisingly, the polymerizing of d) is by virtue of the specific chemical nature of the aliphatic thermoplastic polyurethane of b) performable at advantageously high rates of polymerization within a broad range of temperatures for the polymerization temperature $T_2$. The temperature $T_2$ of d) is preferably in the range from 100 to 175° C., more preferably from 115 to 170° C., more preferably from 130 to 170° C. It is further preferable for $T_2$ to be not less than $T_1$, while the temperature difference $T_2-T_1$ is more preferably in the range from 0 to 40° C., more preferably from 0 to 30° C., more preferably from 0 to 20° C.

Preferably, the temperature $T_2$ is in the range from 100 to 175° C. and the temperature difference $T_2-T_1$ is in the range from 0 to 40° C. More preferably the temperature $T_2$ is in the range from 130 to 170° C. and the temperature difference $T_2-T_1$ is in the range from 0 to 20° C. Alternatively, it is preferable for the temperature $T_2$ to be in the range from 100 to 175° C. and for $T_1$ to be in the range from 100 to 175° C., more preferably for the temperature $T_2$ to be in the range from 130 to 170° C. and for $T_1$ to be in range from 110 to 150° C.

We have found that, surprisingly, the polymerizing as per d) can proceed at an advantageously high rate of polymerization when a salt of caprolactam is used as polymerization catalyst. Accordingly, the polymerization catalyst of d) is preferably a salt of caprolactam, more preferably an alkali or alkaline earth metal salt of caprolactam, more preferably an alkali metal salt of caprolactam, more preferably the sodium salt or the potassium salt of caprolactam, more preferably the sodium salt of caprolactam.

Preferably, the polymerization catalyst is admixed in d) at from 0.2 to 4 wt %, preferably from 0.4 to 3.4 wt %, more preferably from 0.6 to 3 wt %, based on the sum total of the weights of caprolactam and of the thermoplastic polyurethane.

Optionally, a polymerization activator is additionally admixed in step d). The polymerization activator is preferably selected from the group consisting of N-carbonyl-substituted lactams, aliphatic and aromatic diisocyanates, allophanates, polyisocyanates, aliphatic and aromatic diacyl halides, and a mixture of two or more thereof. More preferably, the polymerization activator is selected from the group consisting of N,N'—C1- to N,N'—C20-alkylenedicarbamoylcaprolactams, N-acetyl C3-C10 lactams, C2-C16 alkylene diisocyanates, C5-C12 arylene diisocyanates or C5-C16 arylenealkylene diisocyanates, C1-C6 alkylene allophanates, C12-C24 alkylene polyisocyanates, C2-C16 alkylenediacyl halides, C5-C12 arylenediacyl halides or C5-C16 arylenealkylenediacyl halides, and a mixture of two or more thereof. More preferably, the polymerization activator is selected from the group consisting of N,N'—C3- to N,N'—C8-alkylenedicarbamoylcaprolactams, N-acetyl C4-C8 lactams, C4-C13 alkylene diisocyanates, C6-C10 arylene diisocyanates or C7-C10 arylenealkylene diisocyanates, C2-C4 alkylene allophanates, C16-C20 alkylene polyisocyanates, C4-C13 alkylenediacyl halides, C6-C10 arylenediacyl halides or C8-C12 arylenealkylenediacyl halides, and a mixture of two or more thereof. More preferably, the polymerization activator is selected from the group consisting of N,N'-hexamethylene-1,6-dicarbamoylcaprolactam, acetylcaprolactam, butylene diisocyanate, hexamethylene diisocyanate, methylenebis(cyclohexyl isocyanate); tolylene diisocyanate, ethyl allophanate, trimer of 1,6-hexamethylene diisocyanate (HDI), butylenediacyl bromide, hexamethylenediacyl chloride, 4,4'-methylenebis(cyclohexylacyl chloride), tolylmethylenediacyl chloride, and a mixture of two or more thereof.

The number of carbon atoms which is specified for the lactam, alkylene, arylene and arylenealkylene moieties of the polymerization activator relates to the total number of carbon atoms in the particular lactam, alkylene, arylene and arylenealkylene moiety. "C16 Alkylene" for instance is to be understood as an alkylene moiety having 16 carbon atoms, while "C10 lactam" is to be understood as a lactam moiety having 10 carbon atoms.

The term "arylenealkylene" is to be understood as meaning a moiety consisting of at least one arylene group and at least one alkylene group. The "arylenealkylene" moiety is not subject to any special limitation. C13 Arylenealkylene moieties for example are preferably selected from diphenylmethanes, e.g., 2,2'-diphenylmethane, 2,4'-diphenylmethane or 4,4'-diphenylmethane.

Preferably, the polymerization activator is selected from the group consisting of the N,N'-alkylenedicarbamoylcaprolactams and the mixture of two or more thereof. More preferably, the polymerization activator is selected from the group consisting of N,N'—C1 to N,N'—C20 alkylenedicarbamoylcaprolactams and the mixture of two or more thereof, more preferably from the group consisting of N,N'—C2 to N,N'—C12 alkylenedicarbamoylcaprolactams and the mixture of two or more thereof, more preferably from the group consisting of N,N'—C3 to N,N'—C8 alkylenedicarbamoylcaprolactams and the mixture of two or more thereof. More preferably, the polymerization activator is N,N'-hexamethylene-1,6-dicarbamoylcaprolactam.

The polymerization activator is preferably admixed in d) at from 0.5 to 15 wt %, more preferably from 1 to 12 wt %, more preferably from 2 to 9 wt %, based on the sum total of the weights of the caprolactam and of the thermoplastic polyurethane.

We have found that, surprisingly, the mechanical properties of the thermoplastic copolymer obtained as per d) are engineerable in an advantageous manner by choosing the mass ratio of caprolactam to thermoplastic polyurethane. Preferably, admixing the polymerization catalyst to the liquid mixture of c) as per d) provides a mixture comprising the caprolactam and the thermoplastic polyurethane in a mass ratio of caprolactam to thermoplastic polyurethane in the range from 7:3 to 1:3, preferably from 2:1 to 3:7, more preferably from 16:9 to 9:16.

The thermoplastic copolymer obtained as per d) preferably has an uncopolymerized lactam content of not more than 10 wt %, more preferably of not more than 7 wt %, more preferably of not more than 5 wt %, based on the sum total of the weights of the thermoplastic copolymer and of the uncopolymerized lactam.

Preference is given to a process for preparing a thermoplastic copolymer based on polycaprolactam and a thermoplastic polyurethane, comprising:
a) providing caprolactam;
b) providing the thermoplastic polyurethane having a melting temperature $T_0$ in the range from 160 to 250° C. and based on
    (i) a C3 to C18 alkylene diisocyanate;
    (ii) a C3 to C8 alkylenediol; and
    (iii) a poly(C2 to C6 alkylene) ether having a number-average molecular weight ($M_n$) in the range from 600 to 4500 g;
c) preparing a liquid mixture comprising the caprolactam and the thermoplastic polyurethane at a temperature $T_1$ in the range from 100 to 175° C.;
d) admixing an alkali or alkaline earth metal salt of caprolactam as a polymerization catalyst in an amount from 0.4 to 3.4 wt %, based on the sum total of the weights of the caprolactam and of the thermoplastic polyurethane, to the liquid mixture of c) to obtain a mixture comprising the caprolactam and the thermoplastic polyurethane in a mass ratio of caprolactam to thermoplastic polyurethane in the range from 3:1 to 1:4 and polymerizing at a temperature $T_2$ in the range from 100 to 175° C. to obtain the thermoplastic copolymer.

Preference is given to a process for preparing a thermoplastic copolymer based on polycaprolactam and a thermoplastic polyurethane, comprising:
a) providing caprolactam;
b) providing the thermoplastic polyurethane having a melting temperature $T_0$ in the range from 160 to 250° C. and based on
    (i) a C3 to C18 alkylene diisocyanate;
    (ii) a C3 to C8 alkylenediol; and
    (iii) a poly(C2 to C6 alkylene) ether having a number-average molecular weight ($M_n$) in the range from 600 to 4500 g;
c) preparing a liquid mixture comprising the caprolactam and the thermoplastic polyurethane at a temperature $T_1$ in the range from 100 to 175° C.;
d) admixing an alkali or alkaline earth metal salt of caprolactam as a polymerization catalyst in an amount from 0.4 to 3.4 wt %, based on the sum total of the weights of the caprolactam and of the thermoplastic polyurethane, to the liquid mixture of c) to obtain a mixture comprising the caprolactam and the thermoplastic polyurethane in a mass ratio of caprolactam to thermoplastic polyurethane in the range from 3:1 to 1:4 and polymerizing at a temperature $T_2$ in the range from 100 to 175° C. to obtain the thermoplastic copolymer,
wherein d) further comprises admixing a polymerization activator, wherein the polymerization activator is selected from the group consisting of N,N'—C2 to N,N'—C12 alkylenedicarbamoylcaprolactams and a mixture of two or more thereof in an amount from 1 to 12 wt %, based on the sum total of the weights of the caprolactam and of the thermoplastic polyurethane.

In the process of the present invention, the preparing as per c) and the admixing and polymerizing as per d) are carried out as a batch process or as a continuous process.

Batch Mode of Operation

The process of the present invention is performable as a batch process wherein the preparing of c) and the admixing and polymerizing of d) are carried out as a batch process and wherein the caprolactam provided as per a) is in a molten state and the thermoplastic polyurethane provided as per b) is in a solid state and the liquid mixture of c) is provided by admixing the thermoplastic polyurethane to caprolactam in a molten state.

The preference in this batch process is for the mixture of c) to be maintained at the temperature $T_1$ for a time period in the range from 1 min to 1.5 h, more preferably from 10 min to 70 min, more preferably from 20 min to 60 min.

We have found that, surprisingly, this batch process is particularly useful for performing the polymerizing of d) in a mold to obtain a shaped article when the polymerization catalyst is admixed in the form of a liquid mixture comprising polymerization catalyst and caprolactam. It is accordingly preferable for the polymerization catalyst to be admixed in step d) in the form of a liquid mixture comprising polymerization catalyst and caprolactam.

The term "liquid mixture comprising polymerization catalyst and caprolactam" is to be understood as meaning a mixture in which the polymerization catalyst is dispersed or dissolved in molten, liquid caprolactam.

Preferably, this liquid mixture comprising polymerization catalyst and caprolactam is provided by admixing the polymerization catalyst to caprolactam in a molten state.

The liquid mixture comprising polymerization catalyst and caprolactam preferably comprises the polymerization catalyst in an amount from 2 to 40 wt %, more preferably from 4 to 34 wt %, more preferably from 6 to 30 wt %, based on the weight of the caprolactam.

Preferably, the liquid mixture comprising polymerization catalyst and caprolactam is maintained at the temperature $T_3$ for a time period ranging from 1 min to 1.5 h, more preferably from 10 min to 70 min, more preferably from 20 to 60 min.

The temperature $T_3$ is generally not subject to any limitations. $T_3$ is preferably in the range from 100 to 175° C., more preferably from 105 to 155° C., more preferably from 110 to 130° C.

A polymerization activator may optionally be further admixed in d), wherein the polymerization activator is preferably admixed to the mixture of c). Preferably, the polymerization activator is admixed to the mixture of c) in an amount from 1 to 30 wt %, more preferably from 2 to 24 wt %, more preferably from 4 to 18 wt %, based on the sum total of the weights of the caprolactam and of the thermoplastic polyurethane.

Preferably, the liquid mixture comprising polymerization catalyst and caprolactam is mixed in d) to the liquid mixture of c) in a mass ratio of mixture comprising polymerization catalyst and caprolactam to mixture of c) in the range from 1:4 to 3:1, more preferably from 1:3 to 2:1, more preferably from 1:1.5 to 1.5:1. The liquid mixture comprising polymerization catalyst and caprolactam and the liquid mixture of c) are preferably mixed at a temperature $T_4$. The temperature $T_4$ is preferably in the range from 100 to 175° C., more preferably from 105 to 155° C., more preferably from 110 to 130° C.

The polymerizing of d) is preferably conducted for a time period in the range from 0.1 to 20 min, more preferably from 0.3 to 10 min, more preferably from 0.5 to 3 min.

Preferably, in the batch process described above, the polymerizing of d) is effected in a mold, more preferably in a reaction injection molding (RIM) mold.

Preference is given to a process for preparing a thermoplastic copolymer based on polycaprolactam and a thermoplastic polyurethane, comprising:
a) providing caprolactam;
b) providing the thermoplastic polyurethane having a melting temperature $T_0$ in the range from 160 to 250° C. and based on
   (i) a C3 to C18 alkylene diisocyanate;
   (ii) a C3 to C8 alkylenediol; and
   (iii) a poly(C2 to C6 alkylene) ether having a number-average molecular weight ($M_n$) in the range from 600 to 4500 g;
c) preparing a liquid mixture comprising the caprolactam and the thermoplastic polyurethane at a temperature $T_1$ in the range from 100 to 160° C.;
d) admixing an alkali or alkaline earth metal salt of caprolactam as a polymerization catalyst in an amount from 0.4 to 3.4 wt %, based on the sum total of the weights of the caprolactam and of the thermoplastic polyurethane, to the liquid mixture of c) to obtain a mixture comprising the caprolactam and the thermoplastic polyurethane in a mass ratio of caprolactam to thermoplastic polyurethane in the range from 3:1 to 1:4 and polymerizing at a temperature $T_2$ in the range from 115 to 170° C. to obtain the thermoplastic copolymer, wherein the polymerizing of d) is conducted for a time period in the range from 0.3 to 10 min, wherein the preparing of c) and the admixing and polymerizing of d) are carried out as a batch process and wherein the caprolactam provided as per a) is in a molten state and the thermoplastic polyurethane provided as per b) is in a solid state and the liquid mixture of c) is provided by admixing the thermoplastic polyurethane to caprolactam in a molten state.

Alternatively, the present process is performable as a batch process wherein the preparing of c) and the admixing and polymerizing of d) are carried out as a batch process and wherein the caprolactam provided as per a) is in a solid state and the thermoplastic polyurethane provided as per b) is in a solid state and in c) the caprolactam and the thermoplastic polyurethane are mixed by kneading and the mixture obtained is heated to $T_1$. The preference in this alternative batch mode is for the mixture of c) to be maintained at $T_1$ for a time period ranging from 0.1 to 20 min, more preferably from 0.3 min to 16 min, more preferably from 0.5 to 12 min.

Particular preference is given to a process for preparing a thermoplastic copolymer based on polycaprolactam and a thermoplastic polyurethane, comprising:
a) providing caprolactam;
b) providing the thermoplastic polyurethane having a melting temperature $T_0$ in the range from 160 to 250° C. and based on
   (i) a C3 to C18 alkylene diisocyanate;
   (ii) a C3 to C8 alkylenediol; and
   (iii) a poly(C2 to C6 alkylene) ether having a number-average molecular weight ($M_n$) in the range from 600 to 4500 g;
c) preparing a liquid mixture comprising the caprolactam and the thermoplastic polyurethane at a temperature $T_1$ in the range from 100 to 175° C.;
d) admixing an alkali or alkaline earth metal salt of caprolactam as a polymerization catalyst in an amount from 0.4 to 3.4 wt %, based on the sum total of the weights of the caprolactam and of the thermoplastic polyurethane, to the liquid mixture of c) to obtain a mixture comprising the caprolactam and the thermoplastic polyurethane in a mass ratio of caprolactam to thermoplastic polyurethane in the range from 3:1 to 1:4 and polymerizing at a temperature $T_2$ in the range of from 100 to 175° C. to obtain the thermoplastic copolymer, wherein the polymerizing of d) is conducted for a time period in the range from 0.1 to 20 min, wherein the preparing of c) and the admixing and polymerizing of d) are carried out as a batch process and wherein the caprolactam provided as per a) is in a solid state and the thermoplastic polyurethane provided as per b) is in a solid state and in c) the caprolactam and the thermoplastic polyurethane are mixed by kneading and the mixture obtained is heated to $T_1$.

Surprisingly, the batch modes of operation which are in accordance with the present invention provide a polymerization rate that is higher than that of conventional copolymerization processes for preparing copolymers based on polycaprolactam and a thermoplastic polyurethane and that is advantageously achievable even at a low polymerization temperature $T_2$ of, for example, about 140° C. Therefore, polymerization step d) is performable within an advantageously short time period, contributing to a particularly energy- and time-efficient process.

Continuous Mode of Operation

The process of the present invention is alternatively performable as a continuous process wherein the preparing of c) and the admixing and polymerizing of d) are preferably carried out as a continuous process comprising an extrusion process wherein the preparing of c) is carried out outside the extruder used for the extrusion process, the mixture prepared as per c) is sent to the extruder used for the extrusion process and the polymerizing of d) is carried out inside the extruder. Preferably, the caprolactam provided as per a) is in a solid state and the thermoplastic polyurethane provided as per b) is in a solid state and in c) the caprolactam and thermoplastic polyurethane are mixed by kneading in the extruder and the mixture obtained is heated to $T_1$. The mixture of c) is preferably maintained at $T_1$ for a time period in the range from 5 min to 3 h, more preferably from 10 min to 2 h, more preferably from 20 min to 1 h.

The polymerization catalyst is preferably fed in at least one first zone of the extruder and the mixture of c) is fed in at least one second zone of the extruder, wherein the at least one second zone is downstream of the at least one first zone.

Optionally, a polymerization activator may further be admixed in d). The polymerization activator may in principle be admixed at any suitable location in- or outside the extruder. For example, the polymerization activator may be admixed to a c) mixture prepared outside the extruder or to a c) mixture prepared inside the extruder, before or after admixing the polymerization catalyst as per d). Preferably, the polymerization activator is admixed to the c) mixture prepared outside the extruder.

Preference is given to a process for preparing a thermoplastic copolymer based on polycaprolactam and a thermoplastic polyurethane, comprising:
a) providing a caprolactam;
b) providing the thermoplastic polyurethane having a melting temperature $T_0$ in the range from 160 to 250° C. and based on
   (i) a C3 to C18 alkylene diisocyanate;
   (ii) a C3 to C8 alkylenediol; and
   (iii) a poly(C2 to C6 alkylene) ether having a number-average molecular weight ($M_n$) in the range from 600 to 4500 g;
c) preparing a liquid mixture comprising the caprolactam and the thermoplastic polyurethane at a temperature $T_1$ in the range from 100 to 160° C.;
d) admixing an alkali or alkaline earth metal salt of caprolactam as a polymerization catalyst in an amount from 0.4 to 3.4 wt %, based on the sum total of the weights of the caprolactam and of the thermoplastic polyurethane, to the liquid mixture of c) to obtain a mixture comprising the caprolactam and the thermoplastic polyurethane in a mass ratio of caprolactam to thermoplastic polyurethane in the range from 3:1 to 1:4 and polymerizing at a temperature $T_2$ in the range from 100 to 175° C. to obtain the thermoplastic copolymer, wherein the polymerizing of d) is conducted for a time period in the range from 1 to 6 min,
wherein the preparing of c) and the admixing and polymerizing of d) are carried out as a continuous process comprising an extrusion process wherein the preparing of c) is carried out outside the extruder used for the extrusion process, the mixture prepared as per c) is sent to the extruder used for the extrusion process and the polymerizing of d) is carried out inside the extruder.

Preference is given to a process for preparing a thermoplastic copolymer based on polycaprolactam and a thermoplastic polyurethane, comprising:
a) providing a caprolactam;
b) providing the thermoplastic polyurethane having a melting temperature $T_0$ in the range from 160 to 250° C. and based on
   (i) a C3 to C18 alkylene diisocyanate;
   (ii) a C3 to C8 alkylenediol; and
   (iii) a poly(C2 to C6 alkylene) ether having a number-average molecular weight ($M_n$) in the range from 600 to 4500 g;
c) preparing a liquid mixture comprising the caprolactam and the thermoplastic polyurethane at a temperature $T_1$ in the range from 100 to 160° C.;
d) admixing an alkali or alkaline earth metal salt of caprolactam as a polymerization catalyst in an amount from 0.4 to 3.4 wt %, based on the sum total of the weights of the caprolactam and of the thermoplastic polyurethane, to the liquid mixture of c) to obtain a mixture comprising the caprolactam and the thermoplastic polyurethane in a mass ratio of caprolactam to thermoplastic polyurethane in the range from 3:1 to 1:4 and polymerizing at a temperature $T_2$ in the range from 100 to 175° C. to obtain the thermoplastic copolymer, wherein the polymerizing of d) is conducted for a time period in the range from 1 to 6 min,
wherein the preparing of c) and the admixing and polymerizing of d) are carried out as a continuous process comprising an extrusion process wherein the preparing of c) is carried out outside the extruder used for the extrusion process, the mixture prepared as per c) is sent to the extruder used for the extrusion process and the polymerizing of d) is carried out inside the extruder,
wherein d) further comprises admixing to the c) mixture prepared outside the extruder a polymerization activator, wherein the polymerization activator is selected from the group consisting of N,N'—C2 to N,N'—C12 alkylenedicarbamoylcaprolactams and a mixture of two or more thereof in an amount from 1 to 12 wt %, based on the sum total of the weights of the caprolactam and of the thermoplastic polyurethane.

Alternatively, the present process is performable as a continuous process wherein the preparing of c) and the admixing and polymerizing of d) are carried out as a continuous process comprising an extrusion process wherein the preparing of c) and the polymerizing of d) are carried out inside the extruder used for the extrusion process.

The preference with this alternative continuous mode of operation is for the caprolactam of a) to be provided in a liquid state, for the thermoplastic polyurethane of b) to be provided in a solid state and for the caprolactam in a liquid state and the thermoplastic polyurethane in a solid state to be sent to the extruder.

In this alternative continuous mode of operation, the thermoplastic polyurethane is preferably rendered into the liquid state in at least one first zone of the extruder at a temperature not less than $T_0$. It is further preferable for at least one second zone of the extruder, said at least one second zone being downstream of the at least one first zone of the extruder, to be fed with the caprolactam to obtain the mixture of c). In addition, it is preferably in at least one third zone of the extruder, said at least one third zone being downstream of the at least one second zone of the extruder, that the polymerization catalyst is fed and a step d) polymerization is carried out.

Optionally, in this alternative continuous mode of operation, a polymerization activator may further be admixed in d) wherein the polymerization activator is fed in the form of a mixture with caprolactam in a second zone of the extruder.

Particular preference is given to a process for preparing a thermoplastic copolymer based on polycaprolactam and a thermoplastic polyurethane, comprising:
a) providing a caprolactam;
b) providing the thermoplastic polyurethane having a melting temperature $T_0$ in the range from 160 to 250° C. and based on
   (i) a C3 to C18 alkylene diisocyanate;
   (ii) a C3 to C8 alkylenediol; and
   (iii) a poly(C2 to C6 alkylene) ether having a number-average molecular weight ($M_n$) in the range from 600 to 4500 g;
c) preparing a liquid mixture comprising the caprolactam and the thermoplastic polyurethane at a temperature $T_1$ in the range from 100 to 160° C.;

d) admixing an alkali or alkaline earth metal salt of caprolactam as a polymerization catalyst to the liquid mixture of c) to obtain a mixture comprising the caprolactam and the thermoplastic polyurethane in a mass ratio of caprolactam to thermoplastic polyurethane in the range from 3:1 to 1:4 and polymerizing at a temperature $T_2$ in the range from 100 to 175° C. to obtain the thermoplastic copolymer, wherein the polymerizing of d) is conducted for a time period in the range from 1 to 6 min, wherein the preparing of c) and the admixing and polymerizing of d) are carried out as a continuous process comprising an extrusion process, wherein the preparing of c) and the polymerizing of d) are carried out inside the extruder used for the extrusion process.

Surprisingly, the continuous modes of operation which are in accordance with the present invention provide a polymerization rate that is higher than that of conventional copolymerization processes for preparing copolymers based on polycaprolactam and a thermoplastic polyurethane and that is advantageously achievable even at a low polymerization temperature $T_2$ of about 140° C. The polymerizing of d) is therefore preferably carried out for a time period in the range from 0.5 to 10 min, more preferably 1 to 6 min, more preferably 1.5 to 4 min. Therefore, polymerization step d) is performable within an advantageously short time period, contributing to a particularly energy- and time-efficient process.

Both the continuous processes described above preferably further comprise a process step e) of pelletizing the copolymer obtained as per d). Both the continuous processes described above preferably also further comprise a process step f) of annealing the copolymer obtained as per d), more preferably of annealing the copolymer obtained as per d) and pelletized as per e). The annealing of f) is preferably effected at a temperature in the range from 60 to 170° C., more preferably from 90 to 150° C., more preferably from 100 to 130° C.

Thermoplastic Copolymer

The alkylene moieties of the alkylene diisocyanate at (i), of the alkylenediol at (ii) and of the polyalkylene ether at (iii) are not subject to any special limitation and may each in principle be in a substituted or unsubstituted state. Alkylene moieties in a substituted state preferably have one or more than one substituent, more preferably from one to three substituents, more preferably one substituent, for example. Substituents may be different or identical. Substituents must be inert under the conditions of step c) or d), which is why alkyl moieties are preferable for example. C1-C6 Alkyl moieties are more preferable and C1-C3 alkyl moieties yet more preferable.

The alkylene moieties of the alkylene diisocyanate at (i), of the alkylenediol at (ii) and of the polyalkylene ether at (iii) are preferably in an unsubstituted state.

The alkylene diisocyanate of (i) is preferably selected from the group consisting of C1 to C20 alkylene diisocyanates and a mixture of two or more thereof, more preferably from the group consisting of C3 to C18 alkylene diisocyanates and a mixture of two or more thereof, more preferably from the group consisting of C6 to C13 alkylene diisocyanates and a mixture of two or more thereof, more preferably from the group consisting of 1,6-hexamethylene diisocyanate (HDI), 4,4'-diisocyanatodicyclohexylmethane (H12MDI), 1-isocyanato-3-isocyanatomethyl-3,5,5-trimethylcyclohexane (IPDI) and a mixture of two or more thereof.

For example, C1 to C20 alkylene diisocyanates are selected from the group consisting of C1, C2, C3, C4, C5, C6, C7, C8, C9, C10, C11, C12, C13, C14, C15, C16, C17, C18, C19, C20 alkylene diisocyanate and a mixture of two or more thereof, and C6 to C13 alkylene diisocyanates are selected from the group consisting of C6, C7, C8, C9, C10, C11, C12, C13 alkylene diisocanate and a mixture of two or more thereof.

The alkylenediol of (ii) is preferably selected from the group consisting of C1 to C20 alkylenediols and a mixture of two or more thereof, more preferably from the group consisting of C3 to C8 alkylenediols and a mixture of two or more thereof, more preferably from the group consisting of C4 to C6 alkylenediols and a mixture of two or more thereof, more preferably from the group consisting of 1,4-butanediol, 1,6-hexanediol and a mixture thereof.

For example, C1 to C20 alkylenediols are selected from the group consisting of C1, C2, C3, C4, C5, C6, C7, C8, C9, C10, C11, C12, C13, C14, C15, C16, C17, C18, C19, C20 alkylenediol and a mixture of two or more thereof, and C3 to C8 alkylene diols are selected from the group consisting of C3, C4, C5, C6, C7, C8 alkylenediol and a mixture of two or more thereof.

The polyalkylene ether of (iii) is preferably selected from the group consisting of poly(C1 to C20 alkylene) ethers and a mixture of two or more thereof, further preferably from the group consisting of poly(C2 to C12 alkylene) ethers and a mixture of two or more thereof, further preferably from the group consisting of poly(C2 to C6 alkylene) ethers and a mixture of two or more thereof, wherein the polyalkylene ether of (iii) is further preferably polytetrahydrofuran.

For example, poly(C1 to C20 alkylene) ethers are selected from the group consisting of poly(C1 alkylene) ether, poly(C2 alkylene) ether, poly(C3 alkylene) ether, poly(C4 alkylene) ether, poly(C5 alkylene) ether, poly(C6 alkylene) ether, poly(C7 alkylene) ether, poly(C8 alkylene) ether, poly(C9 alkylene) ether, poly(C10 alkylene) ether, poly(C11 alkylene) ether, poly(C12 alkylene) ether, poly(C13 alkylene) ether, poly(C14 alkylene) ether, poly(C15 alkylene) ether, poly(C16 alkylene) ether, poly(C17 alkylene) ether, poly(C18 alkylene) ether, poly(C19 alkylene) ether, poly(C20 alkylene) ether and a mixture of two or more thereof, and poly(C2 to C6 alkylene) ethers are selected from the group consisting of poly(C2 alkylene) ether, poly(C3 alkylene) ether, poly(C4 alkylene) ether, poly(C5 alkylene) ether, poly(C6 alkylene) ether and a mixture of two or more thereof.

The number of carbon atoms which is specified for the particular alkylene moieties of the alkylene diisocyanate at (i), of the alkylenediol at (ii) and of the polyalkylene ether at (iii) relates to the total number of carbon atoms in the alkylene moiety. "C20 Alkylene" is for instance to be understood as meaning an alkylene moiety that has 20 carbon atoms.

The polyalkylene ether of (iii) preferably has a number-average molecular weight ($M_n$) in the range from 300 to 8000 g, more preferably from 600 to 4500 g, more preferably from 800 to 2500 g.

Preferably, the thermoplastic polyurethane is based on an alkylene diisocyanate as per (i) selected from the group consisting of C1 to C20 alkylene diisocyanates and a mixture of two or more thereof, an alkylenediol as per (ii) selected from the group consisting of C1 to C20 alkylenediols and a mixture of two or more thereof and a polyalkylene ether as per (iii) having a number-average molecular weight ($M_n$) in the range from 300 to 8000 g selected from the group consisting of poly(C1 to C20 alkylene) ethers and a mixture of two or more thereof. More preferably, the thermoplastic polyurethane is based on an alkylene diisocyanate as per (i) selected from the group consisting of C6 to C13 alkylene diisocyanates and a mixture of two or more thereof, an alkylenediol as per (ii) selected from the group consisting of C4 to C6 alkylenediols and a mixture of two or more thereof and a polyalkylene ether as per (iii) having a number-average molecular weight ($M_n$) in the range from 600 to 4500 g selected from the group consisting of poly(C2 to C6 alkylene) ethers. More preferably, the thermoplastic polyurethane is based on an alkylene diisocyanate as per (i) selected from the group consisting of 1,6-hexamethylene diisocyanate (HDI), 4,4'-diisocyanato-dicyclohexylmethane (H12MDI), 1-isocyanato-3-isocyanatomethyl-3,5,5-trimethylcyclohexane (IPDI) and a mixture of two or more thereof, an alkylenediol as per (ii) selected from the group consisting of 1,4-butanediol and 1,6-hexanediol and a mixture thereof and a polyalkylene ether as per (iii) selected from polytetrahydrofuran having a number-average molecular weight ($M_n$) in the range from 800 to 2500 g. More preferably, the thermoplastic polyurethane of b) is based on (i) 1,6-hexamethylene diisocyanate (HDI) or 4,4'-diisocyanatodicyclohexylmethane (H12MDI), (ii) 1,4-butanediol or 1,6-hexanediol and (iii) polytetrahydrofuran having a number-average molecular weight ($M_n$) in the range from 800 to 2500 g.

Preferably, one or more, further preferably two or more, further preferably all of the components alkylene diisocyanate (i), alkylenediol (ii) and polyalkylene ether (iii) have a linear and/or cyclic alkylene moiety, more preferably said alkylene diisocyanate (i) has a linear and/or cyclic alkylene moiety, said alkylenediol (ii) has a linear alkylene moiety and said polyalkylene ether (iii) has a linear alkylene moiety.

As used herein, the term "linear and cyclic alkylene moiety" is to be understood as meaning an alkylene moiety that is assembled from at least one linear alkylene moiety and at least one cyclic alkylene moiety, for example the dicyclohexylmethane moiety of 4,4'-diisocyanatodicyclohexylmethane (H12MDI).

The thermoplastic polyurethane preferably has a number-average molecular weight ($M_n$) in the range from 10 000 to 300 000 g, more preferably from 15 000 to 200 000 g, more preferably from 19 000 to 160 000 g.

The thermoplastic copolymer of the present invention preferably has an uncopolymerized lactam content of not more than 10 wt %, more preferably of not more than 7 wt %, more preferably of not more than 5 wt %, based on the sum total of the weights of the thermoplastic copolymer and of the uncopolymerized lactam.

The thermoplastic copolymer of the present invention preferably comprises the thermoplastic polyurethane in an amount of 30 to 75 wt %, more preferably 33 to 70 wt %, more preferably 36 to 64 wt %, based on the sum total of the weights of the caprolactam and of the thermoplastic polyurethane which are present in the copolymer.

Preference is given to a thermoplastic copolymer based on polycaprolactam and a thermoplastic polyurethane based on
(i) a C3 to C18 alkylene diisocyanate;
(ii) a C3 to C8 alkylenediol; and
(iii) a poly(C2 to C6 alkylene) ether having a number-average molecular weight ($M_n$) in the range from 600 to 4500 g,
wherein the copolymer comprises the thermoplastic polyurethane in an amount of 25 to 80 wt %, based on the sum total of the weights of the caprolactam and of the thermoplastic polyurethane which are present in the copolymer.

The thermoplastic copolymer of the present invention preferably has an elasticity modulus of up to 1500 MPa, more preferably in the range from 100 to 1500 MPa, more preferably from 300 to 700 MPa, determined via DIN EN ISO 527.

The thermoplastic copolymer of the present invention preferably has a breaking stress of up to 80 MPa, more preferably in the range from 5 to 80 MPa, more preferably from 10 to 30 MPa, determined via DIN EN ISO 527.

The thermoplastic copolymer of the present invention preferably has a maximum breaking stress of up to 90 MPa, more preferably in the range from 5 to 90 MPa, more preferably from 10 to 30 MPa, determined via DIN EN ISO 527.

The thermoplastic copolymer of the present invention preferably has a breaking extension in the range from 200 to 800%, more preferably from 300 to 700%, more preferably from 400 to 600%, determined via DIN EN ISO 527.

The thermoplastic copolymer of the present invention is preferably obtained or obtainable by the process which the present invention provides for preparing a thermoplastic copolymer based on polycaprolactam and a thermoplastic polyurethane. It is more preferable for the thermoplastic copolymer of the present invention to be provided in the form of a pellet material obtained or obtainable by the process of the present invention. The thermoplastic copolymer of the present invention is more preferably provided in the form of an annealed pellet material obtained or obtainable by the process of the present invention.

Shaped Article

The shaped article is in principle not subject to any special limitation. The shaped article may be for instance a solid shaped article, i.e., an article devoid of cavities, or a hollow article with cavities, such as a hose for example. The shaped article is preferably a hollow article, more preferably a hose, more preferably a pneumatic hose.

The shaped article preferably has a bursting strength in the range from 30 to 60 bar, more preferably from 35 to 55 bar, more preferably from 40 to 50 bar. The shaped articles of the present invention are thus particularly suitable for service in hoses that must withstand high pressures, for example pneumatic hoses.

The shaped article preferably comprises at least one filler. The filler is in principle not subject to any special limitation. The filler may comprise an organic material or an inorganic material, for example an inorganic material selected from the group of glasses, silicates, carbon black, graphite, metal oxides, metal carbonates, metal sulfates and a mixture of two or more thereof, or an organic material such as, for example, an aramid polymer. The filler may for example be admixed as color pigment, antistat, flame retardant or to mechanically reinforce the shaped article. The form of the filler is not subject to any special limitation. The filler may be in particulate form such as, for example, powder, pellet or ball form, or in the form of a fiber or of a woven fiber. The filler preferably comprises glass fiber, more preferably woven glass fiber. The filler is preferably admixed in the above-described batch process in the course of the polymerizing of d), wherein polymerizing is effected in a mold, preferably in a reaction injection molding (RIM) mold.

The shaped article is preferably made of a thermoplastic copolymer based on polycaprolactam and a thermoplastic polyurethane based on
(i) a C3 to C18 alkylene diisocyanate;
(ii) a C3 to C8 alkylenediol; and
(iii) a poly(C2 to C6 alkylene) ether having a number-average molecular weight ($M_n$) in the range from 600 to 4500 g,
wherein the copolymer comprises the thermoplastic polyurethane in an amount of 25 to 80 wt %, based on the sum total of the weights of the caprolactam and of the thermoplastic polyurethane which are present in the copolymer.

Use

The present invention further provides the method of using the thermoplastic copolymer of the present invention in the manufacture of a shaped article. The shaped article is preferably a hollow article, preferably a hose, more preferably a pneumatic hose. The shaped article preferably comprises at least one filler, more preferably glass fiber, more preferably woven glass fiber.

The present invention is more particularly illustrated by the following preferred embodiments and their combinations resulting from dependency and other references:

1. A process for preparing a thermoplastic copolymer based on polycaprolactam and a thermoplastic polyurethane, comprising:
   a) providing caprolactam;
   b) providing the thermoplastic polyurethane having a melting temperature $T_0$ and based on
      (i) an alkylene diisocyanate;
      (ii) an alkylenediol; and
      (iii) a polyalkylene ether;
   c) preparing a liquid mixture comprising the caprolactam and the thermoplastic polyurethane at a temperature $T_1$;
   d) admixing a polymerization catalyst to the liquid mixture of c) to obtain a mixture comprising the caprolactam and the thermoplastic polyurethane in a mass ratio of caprolactam to thermoplastic polyurethane in the range from 3:1 to 1:4 and polymerizing at a temperature $T_2$ of at most 175° C. to obtain the thermoplastic copolymer.
2. The process according to embodiment 1 wherein the caprolactam is provided by a) in a solid state or in a molten state, more preferably in a molten state.
3. The process according to embodiment 1 or 2 wherein the alkylene diisocyanate of (i) is selected from the group consisting of C1 to C20 alkylene diisocyanates and a mixture of two or more thereof, preferably from the group consisting of C3 to C18 alkylene diisocyanates and a mixture of two or more thereof, more preferably from the group consisting of C6 to C13 alkylene diisocyanates and a mixture of two or more thereof, more preferably from the group consisting of 1,6-hexamethylene diisocyanate (HDI), 4,4'-diisocyanatodicyclohexylmethane (H12MDI), 1-isocyanato-3-isocyanatomethyl-3,5,5-trimethylcyclohexane (IPDI) and a mixture of two or more thereof.
4. The process according to any of embodiments 1 to 3 wherein the alkylenediol of (ii) is selected from the group consisting of C1 to C20 alkylenediols and a mixture of two or more thereof, preferably from the group consisting of C3 to C8 alkylenediols and a mixture of two or more thereof, more preferably from the group consisting of C4 to C6 alkylenediols and a mixture of two or more thereof, more preferably from the group consisting of 1,4-butanediol, 1,6-hexanediol and a mixture thereof.
5. The process according to any of embodiments 1 to 4 wherein the polyalkylene ether of (iii) is selected from the group consisting of poly(C1 to C20 alkylene) ethers and a mixture of two or more thereof, preferably from the group consisting of poly(C2 to C12 alkylene) ethers and a mixture of two or more thereof, further preferably from the group consisting of poly(C2 to C6 alkylene) ethers and a mixture of two or more thereof, wherein the polyalkylene ether of (iii) is further preferably polytetrahydrofuran.
6. The process according to any of embodiments 1 to 5 wherein one or more, preferably two or more, further preferably all of the components alkylene diisocyanate (i), alkylenediol (ii) and polyalkylene ether (iii) have a linear and/or cyclic alkylene moiety, wherein more preferably said alkylene diisocyanate (i) has a linear and/or cyclic alkylene moiety, said alkylenediol (ii) has a linear alkylene moiety and said polyalkylene ether (iii) has a linear alkylene moiety.
7. The process according to any of embodiments 1 to 6 wherein the polyalkylene ether of (iii) has a number-average molecular weight ($M_n$) in the range from 300 to 8000 g, preferably from 600 to 4500 g, more preferably from 800 to 2500 g.
8. The process according to any of embodiments 1 to 7 wherein the thermoplastic polyurethane of b) has a number-average molecular weight ($M_n$) in the range from 10 000 to 300 000 g, preferably from 15 000 to 200 000 g, more preferably from 19 000 to 160 000 g.
9. The process according to any of embodiments 1 to 8 wherein $T_0$ is in the range from 155 to 280° C., preferably from 160 to 250° C., more preferably from 170 to 230° C.
10. The process according to any of embodiments 1 to 9 wherein $T_1$ is not more than $T_0$, wherein $T_1$ is preferably in the range from 100 to 175° C., more preferably from 100 to 160° C., more preferably from 110 to 150° C.
11. The process according to any of embodiments 1 to 10 wherein $T_2$ is in the range from 100 to 175° C., preferably from 115 to 170° C., more preferably from 130 to 170° C.
12. The process according to any of embodiments 1 to 11 wherein $T_2$ is not less than $T_1$, while the temperature difference $T_2-T_1$ is preferably in the range from 0 to 40° C., more preferably from 0 to 30° C., more preferably from 0 to 20° C.
13. The process according to any of embodiments 1 to 12 wherein the polymerization catalyst of d) is a salt of caprolactam, preferably an alkali or alkaline earth metal salt of caprolactam, more preferably an alkali metal salt of caprolactam, more preferably the sodium salt or the potassium salt of caprolactam, more preferably the sodium salt of caprolactam.
14. The process according to any of embodiments 1 to 13 wherein the polymerization catalyst is admixed in d) at from 0.2 to 4 wt %, preferably from 0.4 to 3.4 wt %, more preferably from 0.6 to 3 wt %, based on the sum total of the weights of caprolactam and of the thermoplastic polyurethane.
15. The process according to any of embodiments 1 to 14 wherein a polymerization activator is additionally admixed in step d).
16. The process according to embodiment 15 wherein the polymerization activator is selected from the group consisting of N-carbonyl-substituted lactams, aliphatic and aromatic diisocyanates, allophanates, polyisocyanates, aliphatic and aromatic diacyl halides, and a mixture of two or more thereof, preferably from the group consisting of N,N'—C1- to N,N'—C20-alkylenedicarbamoylcaprolactams, N,N'-alkylenedicarbamoylcaprolactams, N-acetyl C3-C10 lactams, C2-C16 alkylene diisocyanates, C5-C12 arylene diisocyanates. C5-C16 arylenealkylene diisocyanates, C1-C6 alkylene allophanates, C12-C24 alkylene polyisocyanates, C2-C16 alkylenediacyl halides, C5-C12 arylenediacyl halides or C5-C16 arylenealkylenediacyl halides, and a mixture of two or more thereof, more preferably from the group consisting of N,N'—C3- to N,N'—C8-alkylenedicarbamoylcaprolactams, N-acetyl C4-C8 lactams, C4-C13 alkylene diisocyanates, C6-C10 arylene diisocyanates, C7-C10 arylenealkylene diisocyanates, C2-C4 alkylene allophanates, C16-C20 alkylene polyisocyanates, C4-C13 alkylenediacyl halides, C6-C10 arylenediacyl halides or C8-C12 arylenealkylenediacyl halides, and a mixture of two or more thereof.
17. The process according to embodiment 15 or 16 wherein the polymerization activator is selected from the group consisting of N,N'-hexamethylene-1,6-dicarbamoylcaprolactam, acetylcaprolactam, butylene diisocyanate, hexamethylene diisocyanate, methylenebis(cyclohexyl isocyanate); toluylene diisocyanate, ethyl allophanate, trimer of 1,6-hexamethylene diisocyanate (HDI), butylenediacyl bromide, hexamethylenediacyl chloride, 4,4'-methylenebis(cyclohexylacyl chloride), toluylmethylenediacyl chloride, and a mixture of two or more thereof.
18. The process according to any of embodiments 15 to 17 wherein the polymerization activator is selected from the group consisting of N,N'-alkylenedicarbamoylcaprolactams and the mixture of two or more thereof, preferably from the group consisting of N,N'—C1 to N,N'—C20 alkylenedicarbamoylcaprolactams and the mixture of two or more thereof, more preferably from the group consisting of N,N'—C2 to N,N'—C12 alkylenedicarbamoylcaprolactams and the mixture of two or more thereof, more preferably from the group consisting of N,N'—C3 to N,N'—C8 alkylenedicarbamoylcaprolactams and the mixture of two or more thereof, wherein, more preferably, the polymerization activator is N,N'-hexamethylene-1,6-dicarbamoylcaprolactam.
19. The process according to any of embodiments 15 to 18 wherein the polymerization activator is admixed at from 0.5 to 15 wt %, preferably from 1 to 12 wt %, more preferably from 2 to 9 wt %, based on the sum total of the weights of the caprolactam and of the thermoplastic polyurethane.
20. The process according to any of embodiments 1 to 19 wherein the thermoplastic copolymer obtained as per d) has an uncopolymerized lactam content of not more than 10 wt %, preferably of not more than 7 wt %, more preferably of not more than 5 wt %, based on the sum total of the weights of the thermoplastic copolymer and of the uncopolymerized lactam.
21. The process according to any of embodiments 1 to 20 wherein admixing the polymerization catalyst to the liquid mixture of c) as per d) provides a mixture comprising the caprolactam and the thermoplastic polyurethane in a mass ratio of caprolactam to thermoplastic polyurethane in the range from 7:3 to 1:3, preferably from 2:1 to 3:7, more preferably from 16:9 to 9:16.
22. The process according to any of embodiments 1 to 21 wherein the preparing as per c) and the admixing and polymerizing as per d) are carried out as a batch process or as a continuous process, preferably as a continuous process, more preferably as a continuous process comprising an extrusion process.
23. The process according to embodiment 22 wherein the process is carried out as a batch process wherein the caprolactam provided as per a) is in a molten state and the thermoplastic polyurethane provided as per b) is in a solid state and the liquid mixture of c) is provided by admixing the thermoplastic polyurethane to caprolactam in a molten state.
24. The process according to embodiment 23 wherein the mixture of c) is maintained at the temperature $T_1$ for a time period in the range from 1 min to 1.5 h, preferably from 10 min to 70 min, more preferably from 20 to 60 min.
25. The process according to embodiment 23 or 24 wherein the polymerization catalyst is admixed in step d) in the form of a liquid mixture comprising polymerization catalyst and caprolactam.
26. The process according to embodiment 25 wherein the liquid mixture comprising polymerization catalyst and caprolactam is provided by admixing the polymerization catalyst to caprolactam in a molten state.
27. The process according to embodiment 25 or 26 wherein the liquid mixture comprising polymerization catalyst and caprolactam comprises the polymerization catalyst in an amount from 0.4 to 8 wt %, preferably from 0.8 to 6.8 wt %, more preferably from 1.2 to 6 wt %, based on the weight of the caprolactam.
28. The process according to any of embodiments 25 to 27 wherein the liquid mixture comprising polymerization catalyst and caprolactam is maintained at a temperature $T_3$ for a time period ranging from 1 min to 1.5 h, preferably from 10 min to 70 min, more preferably from 20 to 60 min.
29. The process according to embodiment 28 wherein $T_3$ is in the range from 100 to 175° C., more preferably from 105 to 155° C., more preferably from 110 to 130° C.
30. The process according to any of embodiments 23 to 29 wherein a polymerization activator is further admixed in d), and wherein the polymerization activator is preferably admixed to the mixture of c).
31. The process according to embodiment 30 wherein the polymerization activator is admixed to the mixture of c) in an amount from 1 to 30 wt %, preferably from 2 to 24 wt %, more preferably from 4 to 18 wt %, based on the sum total of the weights of the caprolactam and of the thermoplastic polyurethane.
32. The process according to any of embodiments 25 to 31 wherein the liquid mixture comprising polymerization catalyst and caprolactam is mixed in d) to the liquid mixture of c) in a mass ratio of mixture comprising polymerization catalyst and caprolactam to mixture of c) in the range from 1:4 to 3:1, preferably from 1:3 to 2:1, more preferably from 1:1.5 to 1.5:1.
33. The process according to any of embodiments 25 to 32 wherein the liquid mixture comprising polymerization catalyst and caprolactam and the liquid mixture of c) are mixed at a temperature $T_4$.
34. The process according to any of embodiments 25 to 33 where $T_4$ is in the range from 100 to 175° C., preferably from 105 to 155° C., more preferably from 110 to 130° C.
35. The process according to any of embodiments 23 to 34 wherein the polymerizing of d) is conducted for a time period in the range from 0.1 to 20 min, preferably from 0.3 to 10 min, more preferably from 0.5 to 3 min.
36. The process according to embodiment 22 wherein the process is carried out as a batch process wherein the caprolactam provided as per a) is in a solid state and the thermoplastic polyurethane provided as per b) is in a solid state and in c) the caprolactam and the thermoplastic polyurethane are mixed by kneading and the mixture obtained is heated to $T_1$.
37. The process according to embodiment 36 wherein the mixture of c) is maintained at $T_1$ for a time period ranging from 0.1 to 20 min, preferably from 0.3 min to 16 min, more preferably from 0.5 to 12 min.
38. The process according to embodiment 36 or 37 wherein the polymerizing of d) is carried out for a time period in the range from 0.1 to 20 min, preferably from 0.3 to 10 min, more preferably from 0.5 to 3 min.

39. The process according to embodiment 22 wherein the preparing of c) and the admixing and polymerizing of d) are carried out as a continuous process comprising an extrusion process wherein the preparing of c) is carried out outside the extruder used for the extrusion process, the mixture prepared as per c) is sent to the extruder used for the extrusion process and the polymerizing of d) is carried out inside the extruder.

40. The process according to embodiment 39 wherein the caprolactam provided as per a) is in a solid state and the thermoplastic polyurethane provided as per b) is in a solid state and in c) the caprolactam and the thermoplastic polyurethane are mixed by kneading in the extruder and the mixture obtained is heated to $T_1$.

41. The process according to embodiment 39 or 40 wherein the mixture of c) is maintained at $T_1$ for a time period in the range from 5 min to 3 h, preferably from 10 min to 2 h, more preferably from 20 min to 1 h.

42. The process according to any of embodiments 39 to 41 where the polymerization catalyst is fed in at least one first zone of the extruder and the mixture of c) is fed in at least one second zone of the extruder, wherein the at least one second zone is downstream of the at least one first zone.

43. The process according to any of embodiments 39 to 42 wherein a polymerization activator is further admixed in d) and the polymerization activator is admixed to the c) mixture prepared outside the extruder.

44. The process according to any of embodiments 39 to 43 wherein the polymerizing of d) is carried out in at least one zone of the extruder for a time period in the range from 0.5 to 10 min, preferably from 1 to 6 min, more preferably from 1.5 to 4 min.

45. The process according to embodiment 22 wherein the preparing of c) and the admixing and polymerizing of d) are carried out as a continuous process comprising an extrusion process wherein the preparing of c) and the polymerizing of d) are carried out inside the extruder used for the extrusion process.

46. The process according to embodiment 45 wherein the caprolactam of a) is provided in a liquid state and the thermoplastic polyurethane of b) is provided in a solid state and the caprolactam in a liquid state and the thermoplastic polyurethane in a solid state are sent to the extruder.

47. The process according to embodiment 45 or 46 wherein the thermoplastic polyurethane is rendered into the liquid state in at least one first zone of the extruder at a temperature not less than $T_0$.

48. The process according to embodiment 47 wherein at least one second zone of the extruder, said at least one second zone being downstream of the at least one first zone of the extruder, fed with the caprolactam to obtain the mixture of c).

49. The process according to embodiment 48 wherein in at least one third zone of the extruder, said at least one third zone being downstream of the at least one second zone of the extruder, the polymerization catalyst is fed and a step d) polymerization is carried out.

50. The process according to any of embodiments 45 to 49 wherein a polymerization activator is further admixed in d) and the polymerization activator is fed in the form of a mixture with caprolactam in a second zone of the extruder.

51. The process according to any of embodiments 45 to 50 wherein the polymerizing of d) is carried out for a time period in the range from 0.5 to 10 min, preferably 1 to 6 min, more preferably 1.5 to 4 min.

52. The process according to any of embodiments 1 to 51, further comprising:
    e) pelletizing the copolymer obtained as per d).

53. The process according to any of embodiments 1 to 52, further comprising:
    f) annealing the copolymer obtained as per d), preferably the copolymer obtained as per d) and pelletized as per e), preferably at a temperature in the range from 60 to 170° C., more preferably from 90 to 150° C., more preferably from 100 to 130° C.

54. The process according to any of embodiments 23 to 35 wherein the polymerizing of d) is effected in a mold, preferably in a reaction injection molding (RIM) mold.

55. A thermoplastic copolymer based on polycaprolactam and a thermoplastic polyurethane based on
    (i) an alkylene diisocyanate;
    (ii) an alkylenediol; and
    (iii) a polyalkylene ether,
    wherein the copolymer comprises the thermoplastic polyurethane in an amount of 25 to 80 wt %, based on the sum total of the weights of the caprolactam and of the thermoplastic polyurethane which are present in the copolymer.

56. The thermoplastic copolymer according to embodiment 55 wherein the alkylene diisocyanate of (i) is selected from the group consisting of C1 to C20 alkylene diisocyanates and a mixture of two or more thereof, preferably from the group consisting of C3 to C18 alkylene diisocyanates and a mixture of two or more thereof, more preferably from the group consisting of C6 to C13 alkylene diisocyanates and a mixture of two or more thereof, more preferably from the group consisting of 1,6-hexamethylene diisocyanate (HDI), 4,4'-diisocyanatodicyclohexylmethane (H12MDI), 1-isocyanato-3-isocyanatomethyl-3,5,5-trimethylcyclohexane (IPDI) and a mixture of two or more thereof.

57. The thermoplastic copolymer according to embodiments 55 or 56 wherein the alkylenediol of (ii) is selected from the group consisting of C1 to C20 alkylenediols and a mixture of two or more thereof, preferably from the group consisting of C3 to C8 alkylenediols and a mixture of two or more thereof, more preferably from the group consisting of C4 to C6 alkylenediols and a mixture of two or more thereof, more preferably from the group consisting of 1,4-butanediol, 1,6-hexanediol and a mixture thereof.

58. The thermoplastic copolymer according to any of embodiments 55 to 57 wherein the polyalkylene ether of (iii) is selected from the group consisting of poly(C1 to C20 alkylene) ethers and a mixture of two or more thereof, preferably from the group consisting of poly(C2 to C12 alkylene) ethers and a mixture of two or more thereof, further preferably from the group consisting of poly(C2 to C6 alkylene) ethers and a mixture of two or more thereof, wherein the polyalkylene ether of (iii) is further preferably polytetrahydrofuran.

59. The thermoplastic copolymer according to any of embodiments 55 to 58 wherein one or more, preferably two or more, further preferably all of the components alkylene diisocyanate (i), alkylenediol (ii) and polyalkylene ether (iii) have a linear and/or cyclic alkylene moiety, wherein more preferably said alkylene diisocyanate (i) has a linear and/or cyclic alkylene moiety, said alkylenediol (ii) has a linear alkylene moiety and said polyalkylene ether (iii) has a linear alkylene moiety.

60. The thermoplastic copolymer according to any of embodiments 55 to 59 having an uncopolymerized lactam content of not more than 10 wt %, preferably of not more than 7 wt %, more preferably of not more than 5 wt %, based on the sum total of the weights of the thermoplastic copolymer and of the uncopolymerized lactam.
61. The thermoplastic copolymer according to any of embodiments 55 to 60 wherein the polyalkylene ether of (iii) has a number-average molecular weight ($M_n$) in the range from 300 to 8000 g, preferably from 600 to 4500 g, more preferably from 800 to 2500 g.
62. The thermoplastic copolymer according to any of embodiments 55 to 61 wherein the thermoplastic polyurethane has a number-average molecular weight ($M_n$) in the range from 10 000 to 300 000 g, preferably from 15 000 to 200 000 g, more preferably from 19 000 to 160 000 g.
63. The thermoplastic copolymer according to any of embodiments 55 to 62 wherein the copolymer comprises the thermoplastic polyurethane in an amount of 30 to 75 wt %, preferably 33 to 70 wt %, more preferably 36 to 64 wt %, based on the sum total of the weights of the caprolactam and of the thermoplastic polyurethane which are present in the copolymer.
64. The thermoplastic copolymer according to embodiment 63 with an elasticity modulus of up to 1500 MPa, preferably in the range from 100 to 1500 MPa, more preferably from 300 to 700 MPa, determined via DIN EN ISO 527.
65. The thermoplastic copolymer according to embodiment 63 or 64 with a breaking stress of up to 80 MPa, preferably in the range from 5 to 80 MPa, more preferably from 10 to 30 MPa, determined via DIN EN ISO 527.
66. The thermoplastic copolymer according to any of embodiments 63 to 65 with a maximum breaking stress of up to 90 MPa, preferably in the range from 5 to 90 MPa, preferably from 10 to 30 MPa, determined via DIN EN ISO 527.
67. The thermoplastic copolymer according to any of embodiments 63 to 66 with a breaking extension in the range from 200 to 800%, preferably from 300 to 700%, more preferably from 400 to 600%, determined via DIN EN ISO 527.
68. The thermoplastic copolymer according to any of embodiments 55 to 67 obtained or obtainable by a process according to any of embodiments 1 to 54, preferably in the form of a pellet material obtained or obtainable by a process according to either of embodiments 52 and 53, more preferably in the form of an annealed pellet material obtained or obtainable by a process according to embodiment 53.
69. A shaped article obtained or obtainable from a thermoplastic copolymer according to any of embodiments 55 to 68.
70. The shaped article according to embodiment 69 wherein the shaped article is a hollow article, preferably a hose, more preferably a pneumatic hose.
71. The shaped article according to embodiment 69 or 70 with a bursting strength in the range from 30 to 60 bar, preferably from 35 to 55 bar, more preferably from 40 to 50 bar.
72. The shaped article according to any of embodiments 69 to 71 wherein the shaped article comprises at least one filler, preferably provided in the course of the polymerizing of d) according to embodiment 54 in the mold.
73. The shaped article according to embodiment 72 wherein the filler comprises glass fiber, preferably woven glass fiber.
74. The method of using a thermoplastic copolymer according to any of embodiments 55 to 68 in the manufacture of a shaped article.
75. The method according to embodiment 74 wherein the shaped article is a hollow article, preferably a hose, more preferably a pneumatic hose.
76. The method according to embodiment 74 wherein the shaped article comprises at least one filler, preferably glass fiber, more preferably woven glass fiber.

The invention is more particularly elucidated in the examples which follow.

EXAMPLES

The following starting materials are used in the experimental examples, and comparative examples, which follow:
1. Lactam:
   caprolactam, from BASF.
2. Thermoplastic polyurethanes (TPUs), obtained from BASF:
   Elastollan A1185A (TPU based on polytetrahydrofuran 1000; hexamethylene diisocyanate (HDI) and 1,6-hexanediol), annealed at 110° C. for 3 h;
   Elastollan L1185A (TPU based on polytetrahydrofuran, 4,4'-diisocyanatodicyclohexylmethane (H12MDI) and 1,4-butanediol), annealed at 110° C. for 3 h;
   Elastollan E1170A (TPU based on polytetrahydrofuran 1000/2000, methylenediphenyl diisocyanate (MDI) and 1,4-butanediol), annealed at 110° C. for 3 h.
3. Polymerization catalyst:
   Brüggolen C10 (17-19% sodium caprolactamate in caprolactam), from Brüggemann KG, Heilbronn.
4. Polymerization activator:
   Brüggolen C20 (80% hexamethylene-1,6-dicarbamoyl-caprolactam in caprolactam), from Brüggemann KG, Heilbronn.

Example 1A

The polymerization reaction was carried out in a dry atmosphere of nitrogen in a 250 mL round-bottom flask. Caprolactam (120 g) was dissolved at 170° C., followed by the admixture of 80 g of thermoplastic polyurethane (40 wt %) (Elastollan A1185A). The mixture was stirred at $T_1=170°$ C. for 30 min. Then, 23.1 g (11.6 wt %) of the catalyst (Brüggolen C10) were introduced into the molten liquid mixture, starting the polymerization reaction. The anionic polymerization was carried out at $T_2=170°$ C. and stopped after 1 min by cooling the reactor off in ice-water (0° C.).

Example 1B

Example 1A was repeated using Elastollan L1185A thermoplastic polyurethane instead of Elastollan A1185A.

Example 1C

Examples 1A and 1B were repeated except that the thermoplastic polyurethane was dissolved at a temperature of 140° C. instead of 170° C., the mixture comprising caprolactam and the thermoplastic polyurethane is stirred for 30 min at $T_1=140°$ C. instead of at $T_1=170°$ C. and the polymerization reaction was carried out at $T_2=140°$ C. instead of at $T_2=170°$ C.

Example 2A

The polymerization took place on a rheometer (Haake Polylab OS) in a 60 mL reaction chamber. The latter was heated to 170° C. and at the same time filled with 35 g of caprolactam (60 wt %) and 23.3 g of thermoplastic polyurethane (40 wt %) (Elastollan A1185A). The components were mixed at $T_1=170°$ C. for 10 min, followed by admixture of 6.71 g of catalyst (Brüggolen C10) to start the anionic polymerization and carry it out at $T_2=170°$ C. The reaction mixture was kneaded for a further 15 min.

Example 2B

Example 2A was repeated using Elastollan L1185A thermoplastic polyurethane instead of Elastollan A1185A.

Example 2C

Examples 2A and 2B were repeated except that the thermoplastic polyurethane was mixed at a temperature of $T_1=140°$ C. instead of $T_1=170°$ C. and the polymerization reaction was carried out at a temperature of $T_2=140°$ C. instead of $T_2=170°$ C.

Example 3

The thermoplastic copolymer based on polycaprolactam and a thermoplastic polyurethane was prepared on a twin-screw extruder (ZSK 32, L/D=56, Werner & Pfleiderer) whereto a heatable mixing tank was connected at zone 2. The extruder and mixing tank were ventilated with nitrogen in a continuous manner. Homogeneous, liquid mixture of 60 wt % caprolactam and 40 wt % thermoplastic polyurethane (Elastollan A1185A) was prepared in the mixing tank by heating and two hours of stirring. This mixture was temperature-regulated at $T_1=140°$ C. The copolymer was prepared by admixing 11.6 wt % of catalyst (Brüggolen C10) into zone 1 of the extruder by solids metering at 60° C. and liquid metering of the caprolactam-polyurethane mixture into zone 2 at 170° C. Polymerization was achieved in zones 3-15 at $T_2=170°$ C. at a rotary speed of 200 rpm. The copolymer formed was pelletized by underwater separation and annealed at 80° C. Overall residence time in the extruder was about 3 min.

Example 4

Example 3 was repeated except that the caprolactam-polyurethane mixture was premixed for 30 min instead of 2 h and metered into zone 2 of the extruder at $T_1=140°$ C. instead of $T_1=170°$ C. and the polymerization was carried out in zones 3-12 at $T_2=140°$ C. instead of $T_2=170°$ C. In addition, the temperature of the zones 13, 14 and 15 was set to 150° C., 160° C. and 170° C., respectively.

Example 5

Example 3 was repeated except that the caprolactam-polyurethane mixture was premixed for 30 min instead of 2 h. In addition, the catalyst concentration was reduced to 5 wt %.

Comparative Example

Example 3 was repeated except that Elastollan E1170A thermoplastic polyurethane was used instead of Elastollan A1185A and the caprolactam-polyurethane mixture was mixed at $T_1=180°$ C. instead of $T_1=140°$ C. and was metered into zone 2 at 180° C. instead of 170° C. In addition the temperature in zones 13-15 was set to $T_2=180°$ C. instead of $T_2=170°$ C.

Example 6

Example 3 was repeated except that 40 wt % of caprolactam and 60 wt % of thermoplastic polyurethane were used instead of 60 wt % of caprolactam and 40 wt % of thermoplastic polyurethane and caprolactam and thermoplastic polyurethane were premixed for 30 min instead of 2 hours.

Example 7

Example 3 was repeated except that 5.1 wt % of activator (Brüggolen C20) was added to the caprolactam-polyurethane mixture into the mixing container.

Example 8

The thermoplastic copolymer based on polycaprolactam and a thermoplastic polyurethane was prepared on a twin-screw extruder (ZSK 32, L/D=56, Werner & Pfleiderer) ventilated with nitrogen in a continuous manner. The copolymer was prepared by solids metering of 40 wt % of thermoplastic polyurethane (Elastollan A1185A) into zone 1 (120° C.) and melting in zones 2 (160° C.), 3 (220° C.) and 4 (180° C.) with subsequent liquid metering of 60 wt % of caprolactam into zone 5 (140° C.). Subsequent zones were heated to 170° C. and the polymerization was started by admixing 11.6 wt % of catalyst (Brüggolen C10) into zone 7 by solids metering. Overall residence time in the extruder was about 3 min. The copolymer formed was pelletized by underwater separation and annealed at 80° C.

Example 9

Example 8 was repeated except that 40 wt % of caprolactam and 60 wt % of thermoplastic polyurethane (A1185A) were used instead of 60 wt % of caprolactam and 40 wt % of thermoplastic polyurethane.

Determination of Bursting Strength

Bursting strength was determined on shaped articles in the form of hoses having an outer diameter of 8.2 mm and a wall thickness of 8.2 mm. For this purpose, hose samples 30 cm in length were sealed at one end and connected at the other end to a compressed air supply via a control valve. The pressure in the hose sample was raised gradually (at about 30 bar/15 s) to bursting in a chamber temperature-controlled to 23° C. or 70° C. The bursting pressure was recorded as was the time to bursting, because a pre-burst inflation of the hoses can be inferred therefrom. Each test was repeated three times.

TABLE 1

|  | Example | | | | | | | Comparative example |
|---|---|---|---|---|---|---|---|---|
|  | 3 | 4 | 5 | 6 | 7 | 8 | 9 | |
| caprolactam/ wt % | 60 | 60 | 60 | 40 | 60 | 60 | 40 | 60 |
| Brüggolen C10/ wt % | 11.6 | 11.6 | 5 | 11.6 | 11.6 | 11.6 | 11.6 | 11.6 |

TABLE 1-continued

| | Example | | | | | | | Comparative example |
|---|---|---|---|---|---|---|---|---|
| | 3 | 4 | 5 | 6 | 7 | 8 | 9 | |
| Brüggolen C20/wt % | | | | | 5.1 | | | |
| Elastollan A1185A/wt % | 40 | 40 | 40 | 60 | 40 | 40 | 60 | |
| Elastollan E1170A/wt % | | | | | | | | 40 |
| temperature of mixer/° C. | 140 | 140 | 140 | 140 | 140 | | | 180 |
| premix time/min | 120 | 30 | 30 | 30 | 30 | | | 120 |
| temperature of zone 1/° C. | 60 | 60 | 60 | 60 | 60 | 120 | 120 | 60 |
| temperature of zone 2/° C. | 170 | 140 | 170 | 170 | 170 | 160 | 160 | 180 |
| temperature of zone 3/° C. | 170 | 140 | 170 | 170 | 170 | 220 | 220 | 170 |
| temperature of zone 4/° C. | 170 | 140 | 170 | 170 | 170 | 180 | 180 | 170 |
| temperature of zone 5/° C. | 170 | 140 | 170 | 170 | 170 | 140 | 140 | 170 |
| temperature of zones 6-12/° C. | 170 | 140 | 170 | 170 | 170 | 170 | 170 | 170 |
| temperature of zone 13/° C. | 170 | 150 | 170 | 170 | 170 | 170 | 170 | 180 |
| temperature of zone 14/° C. | 170 | 160 | 170 | 170 | 170 | 170 | 170 | 180 |
| temperature of zone 15/° C. | 170 | 170 | 170 | 170 | 170 | 170 | 170 | 180 |
| temperature of dieplate/° C. | 200 | 200 | 200 | 200 | 200 | 200 | 200 | 200 |
| rotary speed/rpm | 200 | 200 | 200 | 200 | 200 | 200 | 200 | 200 |
| throughput/kg/h | 15 | 15 | 15 | 15 | 15 | 15 | 15 | 15 |
| total residence time/min | 3 | 3 | 3 | 3 | 3 | 3 | 3 | 3 |

The present examples are clear in demonstrating the surprising effects associated with the process of the present invention. Owing to the specific TPU copolymer provided as per b), the polymerization of process step d) is performable at an advantageously low temperature $T_2$ of not more than 175° C., as apparent from Examples 1 to 9, which are in accordance with the present invention. By contrast, the step of providing a TPU copolymer based on an aromatic diisocyanate such as, for example, MDI requires a polymerization temperature of about 180° C., as apparent from the comparative example.

REFERENCES CITED

G. S. Yang et al., "Preparation and characterisation of thermoplastic polyurethane elastomer and polyamide 6 blends by in situ anionic ring-opening polymerization of epsilon-caprolactam", Polymer Engineering and Science 2006, 46, pp. 1196-1203

G. S. Yang et al. "A novel approach to the preparation of thermoplastic polyurethane elastomer and polyamide 6 blends by in situ anionic ring-opening polymerisation of ε-caprolactam", Polym. Int. 2006, 55, pages 643-649

DE 10 2006 036 539 A1

We claim:

1. A process for preparing a thermoplastic copolymer based on polycaprolactam and a thermoplastic polyurethane, the process comprising:
    preparing a liquid mixture comprising caprolactam and a thermoplastic polyurethane at a temperature $T_1$; and
    admixing a polymerization catalyst to the liquid mixture to obtain a mixture comprising the caprolactam and the thermoplastic polyurethane in a mass ratio of caprolactam to thermoplastic polyurethane in the range from 3:1 to 1:4, and polymerizing at a temperature $T_2$ of at most 175° C. to obtain the thermoplastic copolymer,
    wherein the thermoplastic polyurethane has a melting temperature $T_0$ and is based on
    (i) an alkylene diisocyanate;
    (ii) an alkylenediol; and
    (iii) a polyalkylene ether.

2. The process according to claim 1, wherein the alkylene diisocyanate of (i) is selected from the group consisting of a C1 to C20 alkylene diisocyanate and a mixture of two or more thereof.

3. The process according to claim 1, wherein the alkylenediol of (ii) is selected from the group consisting of a C1 to C20 alkylenediol and a mixture of two or more thereof.

4. The process according to claim 1, wherein the polyalkylene ether of (iii) is selected from the group consisting of a poly(C1 to C20 alkylene) ether and a mixture of two or more thereof.

5. The process according to claim 1, wherein one or more of the components alkylene diisocyanate (i), alkylenediol (ii) and polyalkylene ether (iii) have a linear and/or cyclic alkylene moiety.

6. The process according to claim 1, wherein $T_0$ is in the range from 155 to 280° C.

7. The process according to claim 1, wherein $T_1$ is not more than $T_0$.

8. The process according to claim 1, wherein $T_2$ is in the range from 100 to 175° C.

9. The process according to claim 1, wherein the polymerization catalyst is a salt of caprolactam.

10. The process according to claim 1, further comprising admixing a polymerization activator to the liquid mixture.

11. The process according to claim 1, wherein the admixing the polymerization catalyst to the liquid mixture provides a mixture comprising the caprolactam and the thermoplastic polyurethane in a mass ratio of caprolactam to thermoplastic polyurethane in the range from 7:3 to 1:3.

12. The process according to claim 1, wherein the preparing of the liquid mixture and the admixing and polymerizing are carried out as a batch process or as a continuous process.

13. A thermoplastic copolymer based on polycaprolactam and a thermoplastic polyurethane based on
   (i) an alkylene diisocyanate;
   (ii) an alkylenediol; and
   (iii) a polyalkylene ether,
   wherein the copolymer comprises the thermoplastic polyurethane in an amount of 25 to 80 wt %, based on the sum total of the weights of the caprolactam and of the thermoplastic polyurethane which are present in the copolymer.

14. The thermoplastic copolymer according to claim 13, wherein the alkylene diisocyanate of (i) is selected from the group consisting of a C1 to C20 alkylene diisocyanate and a mixture of two or more thereof.

15. The thermoplastic copolymer according to claim 13, wherein the alkylenediol of (ii) is selected from the group consisting of a C1 to C20 alkylenediol and a mixture of two or more thereof.

16. The thermoplastic copolymer according to claim 13, wherein the polyalkylene ether of (iii) is selected from the group consisting of a poly(C1 to C20 alkylene) ether and a mixture of two or more thereof.

17. The thermoplastic copolymer according to claim 13, wherein one or more of the components alkylene diisocyanate (i), alkylenediol (ii) and polyalkylene ether (iii) have a linear and/or cyclic alkylene moiety.

18. The thermoplastic copolymer according to claim 13, wherein the copolymer comprises the thermoplastic polyurethane in an amount of 30 to 75 wt %, based on the sum total of the weights of the caprolactam and of the thermoplastic polyurethane which are present in the copolymer.

19. A thermoplastic copolymer, obtained or obtainable by the process according to claim 1.

20. A shaped article made of or obtainable from the thermoplastic copolymer according to claim 13.

* * * * *

UNITED STATES PATENT AND TRADEMARK OFFICE
CERTIFICATE OF CORRECTION

PATENT NO. : 10,329,374 B2
APPLICATION NO. : 15/114994
DATED : June 25, 2019
INVENTOR(S) : Philippe Desbois et al.

Page 1 of 1

It is certified that error appears in the above-identified patent and that said Letters Patent is hereby corrected as shown below:

On the Title Page

Column 2, item (74), Attorney, Agent, or Firm, Line 2, delete "Neudstadt," and insert -- Neustadt, --

In the Specification

Column 3, Line 53, delete "diiscocyanate" and insert -- diisocyanate --

Column 3, Line 56, delete "diisocanate" and insert -- diisocyanate --

Column 4, Line 34, delete "'020 Alkylene'" and insert -- "C20 Alkylene" --

Column 14, Line 1, delete "diiscocyanate" and insert -- diisocyanate --

Column 14, Line 4, delete "diisocanate" and insert -- diisocyanate --

Signed and Sealed this
Fourteenth Day of April, 2020

Andrei Iancu
*Director of the United States Patent and Trademark Office*